US005739233A

United States Patent [19]
Sokolov et al.

[11] Patent Number: 5,739,233
[45] Date of Patent: Apr. 14, 1998

[54] LOW MOLECULAR WEIGHT VINYLIDENE FLUORIDE COPOLYMERS CURABLE AT ROOM TEMPERATURE

[75] Inventors: Sergey Vasilievich Sokolov; Valeriya Ivanovna Skoblikova; Vitali Iraklievich Purtseladze; Tatiana Ivanovna Rabtseva; Igor Vladimirovich Kokotin; Nadyezhda Yegorovna Chulanova; Lev Mikolayevich Senyushov; Mikhail Vasilievich Zhuravlev, all of St. Petersburg, Russian Federation; Albertus VanCleeff, Wilmington, Del.

[73] Assignee: E. I. du Pont de Nemours and Company, Wilmington, Del.

[21] Appl. No.: 698,554

[22] Filed: Aug. 12, 1996

Related U.S. Application Data

[60] Provisional application No. 60/002,270 Aug. 14, 1995.

[51] Int. Cl.$^6$ ..................................... C08F 18/20
[52] U.S. Cl. ........................ 526/245; 526/247; 529/380
[58] Field of Search ..................... 526/245, 247; 524/380

[56] References Cited

U.S. PATENT DOCUMENTS

| | | | |
|---|---|---|---|
| 3,069,401 | 12/1962 | Gallagher | 260/87.7 |
| 4,116,888 | 9/1978 | Ukihashi et al. | 521/31 |
| 4,361,678 | 11/1982 | Tatemoto et al. | 528/374 |
| 4,474,899 | 10/1984 | Resnick | 521/31 |

FOREIGN PATENT DOCUMENTS

| | | | |
|---|---|---|---|
| 0030115 | 6/1981 | European Pat. Off. | 526/245 |
| 2650979 | 5/1978 | Germany . | |
| 1289813 | 11/1989 | Japan | 526/247 |
| 1145445 | 1/1967 | United Kingdom . | |
| 1145445 | 3/1969 | United Kingdom . | |

*Primary Examiner*—Joseph L. Schofer
*Assistant Examiner*—N. Sarofin

[57] ABSTRACT

Low molecular weight copolymers of vinylidene fluoride with fluorinated comonomers having ester functionality are curable at low temperatures to produce elastomers useful as components of heat and corrosion resistant sealants and protective coatings.

7 Claims, No Drawings

LOW MOLECULAR WEIGHT VINYLIDENE FLUORIDE COPOLYMERS CURABLE AT ROOM TEMPERATURE

This application claims the benefit of U.S. provisional application No. 60/002,270; Aug. 14, 1995.

BACKGROUND OF THE INVENTION

This invention relates to low molecular weight copolymers of vinylidene fluoride ($VF_2$) which are curable at low temperature to form rubbery materials.

High molecular weight fluoroelastomers exhibit excellent heat and chemical resistance. Consequently, they have found utility as polymeric components of seals, wire coatings, and diaphragms in equipment which is exposed to high temperatures and corrosive gases. In order to fully develop their desirable physical properties, fluoroelastomers are vulcanized at relatively high temperatures, in excess of 100° C., in the presence of crosslinking agents. Coating and sealant compositions are generally based on low molecular weight polymer compositions which are cured at low temperatures. It would be desirable to have available coating and sealant compositions which exhibit the heat and chemical resistance of high molecular weight fluoroelastomers, but which could be cured at ambient temperatures, preferably in the absence of solvents. Such compositions have not been commercially available.

Copolymers of $VF_2$, hexafluoropropylene (HFP), and perfluoro(alkylvinyl) ethers of the formula

where n=2–12 are disclosed in British Patent 1,145,445. These compositions are high molecular weight products which are solids at room temperature and are prepared by emulsion copolymerization at temperatures of 50° C. using ammonium persulfate as an initiator. The high molecular weight of these compositions does not permit their use in solvent-free sealants cured at low temperature.

Low molecular weight copolymers of $VF_2$ and HFP, having molecular weights of 1,000 to 22,000, wherein the ratio of $VF_2$ to HFP ranges from 70:30 to 45:55, are also known. For example, U.S. Pat. No. 3,069,401 discloses preparation of VF2/HFP copolymers at a temperature of 100°–250° C. in the presence of peroxy initiators. Such compositions are useful as plasticizers in fluorocarbon elastomers, where they function to improve processing. The low molecular weight copolymers are covulcanized with the fluorocarbon elastomers at temperatures in excess of 150° C. Such compositions cannot be cured at ambient temperature to form rubbery materials and consequently they are not suitable for use in sealants and coatings designed for low temperatures application.

Iodine-containing $VF_2$ copolymers which are liquid at room temperature may be obtained by copolymerization of $VF_2$ with one or more other fluoroolefins such as hexafluoropropylene, tetrafluoroethylene, trifluoroethylene, vinyl fluoride, chlorotrifluoroethylene, pentafluoropropylene, perfluorocyclobutylene, perfluoro (methyl vinyl) ether, perfluoro(ethyl vinyl) ether or perfluoro(propyl vinyl) ether. Such liquid copolymers are disclosed in U.S. Pat. No. 4,361,678. These copolymers contain 10–90 (preferably 40–80) mol % $VF_2$ and 1–30 (preferably 2–20) wt. % terminal iodine and have molecular weights of 900–10,000. They may be crosslinked by organic peroxides, polyhydroxy compounds and polyamines. The crosslinking processes, however, take place at 100° C. and are not adaptable to room temperature cure. In addition, the process disclosed in U.S. Pat. No. 4,361,678 results in low yield.

SUMMARY OF THE INVENTION

The present invention is directed to low molecular weight copolymers of vinylidene fluoride having number average molecular weights of 2,500–15,000 comprising copolymerized units of a) vinylidene fluoride, b) a second comonomer unit of the formula

where Q=F, Cl, $CF_3$, $OCF_3$, $OC_2F_5$, or $OC_3F_7$, and c) a third comonomer unit having the formula

where $R'_f=(CF_2)_3COOR$, $(CF_2)_5COOR$, $(CF_2)_3OCF(CF_3)COOR$ $R=C_1-C_6$ alkyl where the molar ratio of copolymerized units of vinylidene fluoride, second comonomer, and third comonomers is (15–120):(3.5–32.5):(1.5–4.0), respectively.

The present invention is further directed to a process for preparation of low molecular weight copolymers of vinylidene fluoride having number average molecular weights of 2,500–15,000 comprising copolymerized units of a) vinylidene fluoride, b) a second comonomer unit of the formula

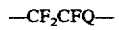

where Q=F, Cl, $CF_3$, $OCF_3$, $OC_2F_5$, or $OC_3F_7$, and c) a third comonomer unit having the formula

where $R'_f=(CF_2)_3COOR$, $(CF_2)_5COOR$, $(CF_2)_3OCF(CF_3)COOR$ $R=C_1-C_6$ alkyl wherein the molar ratio of copolymerized units of vinylidene fluoride, second comonomer, and third comonomers is (15–120):(3.5–32.5):(1.5–4.0), respectively which comprises contacting vinylidene fluoride and said second and third comonomers in solution in an inert solvent at a temperature of from 20° C.–100 ° C. in the presence of an initiator of the formula

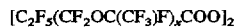

where x=1–3 and wherein the molar ratio of vinylidene fluoride, said second comonomer, and said third comonomer is 1:(1.2–0.1):(0.02–0.1).

DETAILED DESCRIPTION OF THE INVENTION

The compositions of the present invention are low molecular weight copolymers of vinylidene fluoride which are fluids at room temperature and which can be used in the absence of solvents, or with small amounts of solvent, to prepare sealants and coatings having excellent fuel resistance and chemical resistance. In addition, the copolymers are curable at relatively low temperatures, including ambient temperature, and can be used to produce molded goods. Solvent-free sealants are desirable because the presence of solvents results in shrinkage and porosity. Such problems are accentuated when vulcanization takes place at elevated temperatures.

The copolymers of the present invention are terpolymers of vinylidene fluoride, a second comonomer which is a halogenated olefin or a fluorinated ether, and a third comonomer which is a fluorinated ester. The second comonomer may be a chlorinated or fluorinated 1,1,2-trifluoroethylene, hexafluoropropylene, perfluoro(methyl vinyl) ether, perfluoro(ethyl vinyl) ether, or perfluoro(propyl vinyl) ether. The third comonomer is a derivative of perfluorovinyl ether having ester moieties. These comonomers act as cure sites and are selected from the group consisting of compounds of the formula

where $R'_f=(CF_2)_3COOR$, $(CF_2)_5COOR$, $(CF_2)_3OCF(CF_3)COOR$ and $R=C_1-C_6$ alkyl Specific preferred examples of such comonomers are $CF_2CFO(CF_2)_3COOCH_3$; $CF_2CFO(CF_2)_5COOCH_3$; and $CF_2CFO(CF_2)_3OCF(CF_3)COOCH_3$.

The number average molecular weight of the polymers of the present invention is 2,500–15,000, preferably 3,000–7,000. Copolymers having number average molecular weights above 15,000 have viscosities which are too high for use as caulks without solvents.

The copolymers may be prepared by batch or continuous processes in an inert solvent in the presence of a free radical initiator. For example, one preferred process involves contacting vinylidene fluoride and the above-described second comonomer and third comonomer in the presence of a peroxide initiator such as a bis-(perfluoropolyoxaalkanoyl) peroxide of the structure

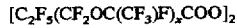

where $x=1-3$. Other peroxide initiators which are suitable for use in preparation of the terpolymers include those peroxides of the general formula $[RfCOO]_2$, where Rf is a perfluorochloroalkyl or perfluorochlorocycloalkyl radical.

In order to obtain copolymers with improved resistance to some aggressive media, for example, gaseous fluorine, it is preferable to carry out the polymerization in the presence of a chain transfer agent of the formula $RfBr_x$, where $x=1$ or 2 and Rf is a perfluorinated alkyl radical. Preferably, the chain transfer agent is 1,2-dibromotetra-fluoroethane. Generally, the 1,2-dibromotetrafluoroethane is present in an amount such that the molar ratio of the brominated tetrafluoroethane to monomers is (0.2–2.2):1.

The reaction may be carried out at pressures below 0.8 MPa with stirring. A reaction time of 4–6 hours is usually sufficient and yields of 70–90% are generally attainable.

Bis-(perfluoropolyoxaalkanoyl)peroxides suitable for use as initiators in the copolymerization reaction may be prepared by the procedure disclosed by A. S. Sibert and D. Swern, *Analytical Chemistry*, 30, No. 3, 385 (1958). The procedure consists of reacting acid fluorides and hydrogen peroxide in the presence of potassium hydroxide at −10° C. in CFC-113.

The terpolymers contain ester moieties which act as cure sites. Polyamines may be utilized to crosslink the polymers at ambient temperature. Suitable polyamines include aliphatic and fatty aromatic di- and polyamines, such as xylylene diamine, hexamethylene diamine, and diethylene triamine. Generally, about 3–8 parts of polyamine curative is utilized per 100 parts of polymer. Curing occurs over a period of several hours at ambient temperature. For example, the terpolymers may be mixed with a polyamine curative within a period of 5–20 minutes. The resultant mixture may then be introduced to a mold which is held under pressure of, for example, 10 MPa for periods of approximately 18–24 hours. Longer periods of up to 170 hours at room temperatures may be utilized to more fully develop a crosslinked network.

Cured polymers of the invention are suitable for use as components of coatings or adhesive formulations. When utilized in such applications the polymer compositions may be blended with various conventional additives such as fillers, antioxidants, antiozonants, solvents, retarders, anti-corrosion additives, pigments, and adhesive resins. Generally, such additives are present in amounts of from 1–150 parts per 100 parts polymer, preferably 5–50 parts per 100 parts polymer. The pot life of the compositions on mixing with various additives is generally not less than 8 hours at room temperature. When used in coating applications, the copolymer formulation may be applied with a brush, spray, or by dipping. Fluorinated alcohols, for example, $H(CF_2)_nCH_2OH$, where n is 1–4 may be used as retarders, especially for liquid copolymers of the invention, and serve to control pot life and enhance physical properties. When such fluorinated alcohols are present pot life can typically be extended several orders of magnitude without sacrifice of tensile strength.

The invention is illustrated by the following embodiments wherein all parts are by weight unless otherwise specified.

EXAMPLES

Test Methods

Number Average Molecular Weight was determined ebullioscopically by dissolving a weighed amount of copolymer in pentafluorochlorobenzene.

Dynamic viscosity of the copolymer was measured on a Hoppler viscosimeter.

$^{19}F$ NMR spectra were recorded on an AM-500 Brucker instrument with a working frequency of 476 MHz. NMR spectra of the copolymers were run in hexafluorobenzene.

Example 1

A mixture of 37.6 g (0.59 mole) of vinylidene fluoride ($VF_2$), 51.8 g (0.345 mole) hexafluoropropylene (HFP), 19.0 g (0.047 mole) of is $CF_2=CFO(CF_2)_5COOCH_3$ (PFVE-II), 110 ml (0.037 mole) of a 0.34M solution of bis (perfluoropolyoxaalkanoyl)peroxide of the formula

in Freon®113 refrigerant (available from E. I. du Pont de Nemours & Co.), and an additional 234 g of Freon®113 was charged into an evacuated and cooled stainless steel, jacketed pressure reactor, having a volume of 0.5 liters and equipped with an agitator. The molar ratio of $VF_2$:HFP:PFVE-II was 1:0.59:0.79 and the molar ratio of peroxide to the sum of monomers was 0.038:1. The polymerization was carried out at a temperature of 40° C. The initial pressure was 0.7 MPa and fell over a period of 5 hours to 0.18 MPa. After the pressure drop had ceased, the reaction mass was agitated at 40° C. for an addition hour and then discharged into the flask of a rotary evaporator. The solvent and volatiles were removed under vacuum at a pressure of 3–5 mm Hg, while gradually heating the contents of the flask to 150° C. The copolymer product was heated under vacuum for an hour at 150°–160° C. A viscous, semi-transparent liquid copolymer was obtained weighing 98 g. This represented a yield of 91%. The copolymer had a dynamic viscosity ($\eta$) at 50° C. of 45 Pa.s and a number average molecular weight ($M_n$) of 4100. $^{19}$F NMR analysis revealed that the copolymer product consisted of copolymerized units of $VF_2$, HFP, PFVE-II, and $[C_2F_5CF_2OCF(CF_3)]$ in a molar ratio of 4.40:1.0:0.34:0.32 which corresponds to a copolymer having copolymerized units of $(VF_2)_{27.2}(HFP)_{6.2}$ $(PFVE-II)_{2.1}$ and $[C_2F_5CF_2OCF(CF_3)]$- endgroups in an amount of 1.98. The composition in wt. % calculated for a polymer of this composition is C: 29.9; F: 65.4; H: 1.49. Found: C: 30.3; F: 65.2; H: 1.4.

Example 2

A mixture of 40.8 g (0.64 mole) $VF_2$, 57.4 g (0.38 mole) HFP, and 6.24 g (0.02 mole) $CF_2=CFO(CF_2)_3COOCH_3$ (PFVE-I) was copolymerized in the presence of 31.8 ml (0.0073 mole) of a 0.23M solution of a peroxide of the formula

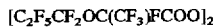

$[C_2F_5CF_2OC(CF_3)FCOO]_2$ in Freon®113 refrigerant. The reaction mixture also included an additional 386 g of Freon®113 refrigerant. The reaction conditions were substantially the same as described in Example 1. The molar ratio of $VF_2$:HFP:PFVE-I was 1:0.60:0.32 and the molar ratio of peroxide to the sum of the monomers was 0.007:1. The copolymerization was carried out at 30° C. over a period of 4 hours and 80 g of a copolymer grease product was isolated having $M_n$ of 15,000; representing a yield of 77%. $^{19}$F NMR analysis revealed that the copolymer product consisted of copolymerized units of $VF_2$, HFP, PFVE-I, and $[C_2F_5CF_2OCF(CF_3)]$ in a molar ratio of 3.71:1.0:0.12:0.06 which corresponds to a copolymer having copolymerized units of $(VF_2)_{120.7}(HFP)_{32.5}(PFVE-I)_{3.9}$ and $[C_2F_5CF_2OCF(CF_3)]$- endgroups in an amount of 1.95. The composition in wt. % calculated for a polymer of this composition is C: 31.0; F: 65.4; H: 1.69. Found: C: 31.3; F: 65.9; H: 1.6.

Example 3

A mixture of 40.4 g (0.63 mole) $VF_2$, 56.6 g (0.38 mole) HFP, and 10.8 g (0.035 mole) $CF_2=CFO(CF_2)_3COOCH_3$ (PFVE-I) was copolymerized in the presence of 44.8 ml (0.016 mole) of a 0.355M solution of a peroxide of the formula

$[C_2F_5CF_2OC(CF_3)FCOO]_2$ in Freon®113 refrigerant. The reaction mixture also included an additional 341 g of Freon®113 refrigerant and 59.8 g (0.23 mole) of 1,2-dibromotetrafluoroethane. The reaction conditions were substantially the same as described in Example 1. The molar ratio of $VF_2$:HFP:PFVE-I was 1:0.60:0.056; the molar ratio of peroxide to the sum of the monomers was 0.015:1; and the molar ratio of dibromotetrafluoroethane to the sum of monomers was 0.22:1. The copolymerization was carried out at 40° C. over a period of 4 hours. The initial pressure of 0.75 MPa dropped to 0.18 MPa and after the lower pressure was reached, the reaction mass was agitated at 40° C. for an additional hour. After removal of solvent and volatiles substantially as described in Example 1, 83 g of a viscous, semi-transparent liquid copolymer product was isolated having $M_n$ of 5500; representing a yield of 77%. The copolymer had a dynamic viscosity ($\eta$) at 50° C. of 62 Pa.s. $^{19}$F NMR analysis revealed that the copolymer product consisted of copolymerized units of $VF_2$, HFP, PFVE-I, and $[C_2F_5CF_2OCF(CF_3)]$ in a molar ratio of 3.32:1.0:0.25:0.09 which corresponds to a copolymer having copolymerized units of $(VF_2)_{37.2}(HFP)_{11.2}$ $(PFVE-I)_{2.8}$ and $[C_2F_5CF_2OCF(CF_3)]$- endgroups in an amount of 1.01. In addition elemental analysis showed the copolymer contained 1.5 wt. % Br. The composition in wt. % calculated for a polymer of this composition is C: 29.8; F: 64.2; H: 1.50. Found: C: 29.2; F: 64.3; H: 1.6.

Example 4

Using the method of Example 3, a mixture of 38.7 g (0.60 mole) $VF_2$, 94.6 g (0.36 mole) perfluoro(propyl vinyl) ether (PPVE), and 14.7 g (0.048 mole) $CF_2=CFO(CF_2)_3COOCH_3$ (PFVE-I) was copolymerized in the presence of 48.8 ml (0.015 mole) of a 0.31M solution of a peroxide of the formula

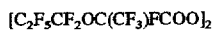

$[C_2F_5CF_2OC(CF_3)FCOO]_2$ in Freon®113 refrigerant. The reaction mixture also included an additional 248 g of Freon®113 refrigerant and 57.7 g (0.22 mole) of 1,2-dibromotetrafluoroethane. The molar ratio of $VF_2$:PPPVE:PFVE-I was 1:0.59:0.079; the molar ratio of peroxide to the sum of the monomers was 0.015:1; and the molar ratio of dibromotetrafluoroethane to the sum of monomers was 0.22:1. The copolymerization was carried out at 40° C. over a period of 4 hours. After removal of solvent and volatiles substantially as described in Example 3, 120 g of a copolymer grease product was isolated having $M_n$ of 8400; representing a yield of 81%. The copolymer had a dynamic viscosity ($\eta$) at 50° C. of 92 Pa.s. $^{19}$F NMR analysis revealed that the copolymer product consisted of copolymerized units of $VF_2$, PPVE, PFVE-I, and $[C_2F_5CF_2OCF(CF_3)]$ in a molar ratio of 2.33:1.0:0.13:0.06 which corresponds to a copolymer having copolymerized units of $(VF_2)_{40.9}(PPVE)_{17.5}(PFVE-I)_{2.3}$ and $[C_2F_5CF_2OCF(CF_3)]$- endgroups in an amount of 1.05. In addition elemental analysis showed the copolymer contained 0.9 wt. % Br. The composition in wt. % calculated for a polymer of this composition is C: 27.4; F: 65.8; H: 1.05. Found: C: 27.9; F: 65.3; H: 1.2.

Example 5

Using the method of Example 3, a mixture of 42.8 g (0.67 mole) $VF_2$, 59.4 g (0.40 mole) HFP and 17.5 g (0.043 mole) $CF_2=CFO(CF_2)_5COOCH_3$ (PFVE-II) was copolymerized in the presence of 23.4 ml (0.008 mole) of a 0.355M solution of a peroxide of the formula

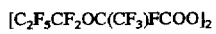

$[C_2F_5CF_2OC(CF_3)FCOO]_2$ in Freon®113 refrigerant. The reaction mixture also included an additional 258 g of Freon®113 refrigerant and 203 g (0.78 mole) of 1,2-dibromotetrafluoroethane. The molar ratio of $VF_2$:HFP:PFVE-II was 1:0.59:0.039; the molar ratio of peroxide to the sum of the monomers was 0.0075:1; and the molar ratio of dibromotetrafluoroethane to the sum of monomers was 0.7:1. The copolymerization was carried out at 25° C. over a period of 6 hours. After removal of solvent and volatiles substantially as described in Example 3, 89 g of a viscous, semi-transparent liquid copolymer product was isolated having $M_n$ of 4500; representing a yield of 77%. The copolymer had a dynamic viscosity ($\eta$) at 50° C. of 51 Pa.s. $^{19}$F NMR analysis revealed that the copolymer product consisted of copolymerized units of $VF_2$, PPVE, PFVE-I, and $[C_2F_5CF_2OCF(CF_3)]$ in a molar ratio of 3.28:1.0:0.32:0.07 which corresponds to a copolymer having copolymerized units of $(VF_2)_{27.8}(HFP)_{8.5}(PFVE-I)_{2.7}$ and $[C_2F_5CF_2OCF(CF_3)]$- endgroups in an amount of 0.59. In addition elemental analysis showed the copolymer contained 2.5 wt. % Br. The composition in wt. % calculated for a polymer of this composition is C: 29.3; F: 63.7; H: 1.42. Found: C: 29.8; F: 64.0; H: 1.5.

Example 6

Using the method of Example 3, a mixture of 40.1 g (0.63 mole) $VF_2$, 55.8 g(0.37 mole), HFP (0.37 mole), and 25.4 g (0.060 mole) $CF_2\!=\!CFO(CF_2)_3OCF(CF_3)COOCH_3$ (PFVE-III) was copolymerized in the presence of 21.2 ml (0.008 mole) of a 0.375M solution of a peroxide of the formula

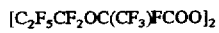
[$C_2F_5CF_2OC(CF_3)FCOO$]$_2$ in Freon®113 refrigerant. The reaction mixture also included 401 g (1.54 mole) of 1,2-dibromotetrafluoroethane. The molar ratio of $VF_2$:HFP:PFVE-III was 1:0.59:0.096; the molar ratio of peroxide to the sum of the monomers was 0.0075:1; and the molar ratio of dibromotetrafluoroethane to the sum of monomers was 1.46:1. The copolymerization was carried out at 25° C. over a period of 6 hours. After removal of solvent and volatiles substantially as described in Example 3, 90 g of a viscous, semi-transparent liquid copolymer product was isolated having $M_n$ of 2500; representing a yield of 74%. The copolymer had a dynamic viscosity (η) at 50° C. of 12 Pa.s. $^{19}$F NMR analysis revealed that the copolymer product consisted of copolymerized units of $VF_2$, HFP, PFVE-III, and [$C_2F_5CF_2OCF(CF_3)$] in a molar ratio of 4.30:1.0:0.50:0.06 which corresponds to a copolymer having copolymerized units of $(VF_2)_{15.0}(HFP)_{3.5}(PFVE-III)_{1.7}$ and [$C_2F_5CF_2OCF(CF_3)$]- endgroups in an amount of 0.21 and Br endgroups in an amount of 1.75. In addition elemental analysis showed the copolymer contained 5.6 wt. % Br. The composition in wt. % calculated for a polymer of this composition is C: 28.2; F: 60.2; H: 1.40. Found: C: 28.5; F: 60.1; H: 1.4.

Example 7

Using the method of Example 3, a mixture of 40.8 g (0.64 mole) $VF_2$, 53.0 g(0.32 mole) perfluoro(methyl vinyl) ether (PMVE), and 14.6 g (0.048 mole) $CF_2\!=\!CFO(CF_2)_3COOCH_3$ (PFVE-I) was copolymerized in the presence of 13.8 ml (0.002 mole) of a 0.145M solution of a peroxide of the formula

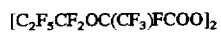
[$C_2F_5CF_2OC(CF_3)FCOO$]$_2$ in Freon®113 refrigerant. The reaction mixture also included 580 g (2.23 mole) of 1,2-dibromotetrafluoroethane. The molar ratio of $VF_2$:PMVE:PFVE-I was 1:0.50:0.075; the molar ratio of peroxide to the sum of the monomers was 0.0002:1; and the molar ratio of dibromotetrafluoroethane to the sum of monomers was 2.22:1. The copolymerization was carried out at 30° C. over a period of 4 hours. After removal of solvent and volatiles substantially as described in Example 3, 77 g of a viscous, semi-transparent, liquid copolymer product was isolated having $M_n$ of 4800; representing a yield of 71%. The copolymer had a dynamic viscosity (η) at 50° C. of 53 Pa.s. $^{19}$F NMR analysis revealed that the copolymer product consisted of copolymerized units of $VF_2$, PMVE, and PFVE-I in a molar ratio of 2.66:1.0:0.14 which corresponds to a copolymer having copolymerized units of $(VF_2)_{31.9}(PMVE)_{12.6}(PFVE-I)_{1.7}$ and Br endgroups in an amount of 1.98. In addition, elemental analysis showed the copolymer contained 3.3 wt. % Br. The composition in wt. % calculated for a polymer of this composition is C: 28.4; F: 61.2; H: 1.43. Found: C: 29.2; F: 61.0; H: 1.5.

Copolymer Vulcanization

The copolymer products of Examples 1–7 can be cured by the addition of aliphatic or fatty aromatic di- and polyamines at room temperature in an amount of 3–8 parts per hundred parts of polymer. The copolymers of Examples 1–7 were each mixed with 4–7 parts by weight of xylylene diamine (75:25 mixed meta and para isomers) curing agent at room temperature over a period of 3 to 5 minutes. In the case of the copolymers of Examples 2 and 4, 10 to 20 parts of ethyl acetate was additionally present. The compositions were then placed in a mold and maintained under a pressure of 10 MPa at room temperature for a period of 18 to 24 hours. The vulcanizates thus obtained were rubbery materials that attained maximum physicomechanical properties after 120–170 hours at room temperature or during a brief heat cycle at 70° C. The results of physicomechanical tests of the cured compositions are shown in Table I. The copolymers of Examples 3–7, which were prepared in the presence of 1,2-dibromotetrafluoroethane exhibit enhanced resistance to gaseous fluorine as illustrated by the results of exposure for 120 hours at 20° C. at a gauge pressure of 0.05 MPa for the polymers of Examples 1 and 5. Results are shown in Table II.

TABLE I

| Composition | Example 1 | Example 2 | Example 3 | Example 4 | Example 5 | Example 6 | Example 7 |
| --- | --- | --- | --- | --- | --- | --- | --- |
| $M_n$ | 4,100 | 15,000 | 5,500 | 8,400 | 4,500 | 2,500 | 4,800 |
| Amine$^1$ (phr) | 7 | 4 | 7 | 5 | 7 | 7 | 7 |
| Solvent$^2$ (phr) | — | 20 | — | 10 | — | — | — |
| Properties After 24 hours @ 25° C. | | | | | | | |
| Tensile Strength, $T_B$, (MPa) | 2.0 | 1.5 | 2.3 | 1.4 | 2.7 | 1.5 | 1.3 |
| Elongation at Break, $E_B$, (%) | 210 | 300 | 250 | 250 | 220 | 270 | 290 |
| Properties After 170 hours @ 25° C. | | | | | | | |
| Tensile Strength, $T_B$, (MPa) | 3.7 | 4.5 | 3.5 | 3.7 | 4.0 | 2.9 | 3.0 |
| Elongation at Break, $E_B$, (%) | 190 | 180 | 180 | 200 | 185 | 160 | 170 |

$^1$Xylylene diamine
$^2$Ethyl Acetate

TABLE II

| Composition | Example 1 | Example 5 |
|---|---|---|
| Initial Properties | | |
| Tensile Strength, $T_B$, (MPa) | 3.7 | 4.0 |
| Elongation at Break, $E_B$, (%) | 190 | 185 |
| Properties After Exposure to Fluorine Gas | | |
| Tensile Strength, $T_B$, (MPa) | 1.9 | 4.5 |
| Elongation at Break, $E_B$, (%) | 250 | 180 |

We claim:

1. A composition comprising low molecular weight copolymers of vinylidene fluoride having number average molecular weights of 2,500–15,000 comprising copolymerized units of a) vinylidene fluoride, b) a second comonomer unit of the formula $$-CF_2CFQ-$$

where Q=F, Cl, $CF_3$, $OCF_3$, $OC_2F_5$, or $OC_3F_7$, and c) a third comonomer unit having the formula $$-CF_2CFOR'_f-$$

where $R'_f$=$(CF_2)_3COOR$, $(CF_2)_5COOR$, $(CF_2)_3OCF(CF_3)COOR$ R=$C_1$-$C_6$ alkyl where the molar ratio of copolymerized units of vinylidene fluoride, second comonomer, and third comonomers is (15–120):(3.5–32.5):(1.5–4.0), respectively.

2. A process for preparation of low molecular weight copolymers of vinylidene fluoride having number average molecular weights of 2,500–15,000 comprising copolymerized units of a) vinylidene fluoride, b) a second comonomer unit of the formula $$-CF_2CFQ-$$

where Q=F, Cl, $CF_3$, $OCF_3$, $OC_2F_5$, or $OC_3F_7$, and c) a third comonomer unit having the formula $$-CF_2CFOR'_f-$$

where $R'_f$=$(CF_2)_3COOR$, $(CF_2)_5COOR$, $(CF_2)_3OCF(CF_3)COOR$ R=$C_1$-$C_6$ alkyl wherein the molar ratio of copolymerized units of vinylidene fluoride, second comonomer, and third comonomers is (15–120):(3.5–32.5):(1.5–4.0), respectively which comprises contacting vinylidene fluoride and said second and third comonomers in solution in an inert solvent at a temperature of from 20° C.–100° C. in the presence of an initiator of the formula $$[C_2F_5(CF_2OC(CF_3)F)_xCOO]_2$$

where x=1–3.

3. The composition of claim 1 wherein Q is $CF_3$.

4. The composition of claim 1 wherein Q is $OCF_3$.

5. The composition of claim 1 wherein Q is $OC_3F_7$.

6. The composition of claim 1 wherein the R group in the third monomer is a $C_1$ alkyl group.

7. A composition of claim 1 which additionally contains a fluorinated alcohol of the formula $H(CF_2CF_2)_n CH_2OH$, where n is 1–4.

* * * * *